3,480,384
Patented Nov. 25, 1969

3,480,384
SELECTIVE REMOVAL OF OXYGEN FROM A HYDROGEN-ETHYLENE STREAM
Leslie C. Hardison, Chippewa Falls, Wis., assignor to Universal Oil Products Company, Des Plaines, Ill., a corporation of Delaware
No Drawing. Filed Mar. 14, 1966, Ser. No. 533,843
Int. Cl. C01b 2/00; C07c 11/04
U.S. Cl. 23—2       6 Claims The present invention relates to a method for effecting the removal of low quantities of oxygen from a hydrogen-ethylene rich stream. More specifically, there is provided a method for catalytically converting and eliminating small quantities of oxygen from a process stream containing relatively large quantities of both hydrogen and ethylene under conditions to substantially preclude any hydrogenation of the ethylene content.

In attempting to effect the catalytic removal of residual oxygen in a processing stream containing hydrogen and ethylene by the combination of hydrogen and oxygen to form water, it is generally considered impracticable because of the inevitable saturation of the ethylene, Actually, on a basis of equilibrium aspects, it appears that a temperature in excess of about 1500° F. is required to suppress ethylene hydrogenation of the order of 3 percent so that in the present improved catalytic operation, which can be carried out in the 700° F. to 850° F. temperature range, it is quite unusual or remarkable to substantially preclude the saturation of the ethylene.

Briefly, the present invention embodies a method for catalytically converting and removing a low oxygen content from a process stream containing both hydrogen and ethylene so as to substantially preclude ethylene conversion, which comprises, passing such stream into contact with an active oxidation catalyst at a temperature above about 650° F. and with sulphur added in an amount from about 1 to about 15 grains per 100 standard cubic feet of stream flow.

With respect to the catalytic scavenging of oxygen, i.e., the catalyzed combination of oxygen and hydrogen to form water vapor, the reaction will generally start at room temperature conditions with a normally active oxidation-hydrogenation type catalyst. However, in order to obtain a balance between obtaining a good efficiency in effecting oxygen disappearance and a minimization of ethylene saturation, then a higher temperature of above 650° F., and generally in the 700 to 850° F. range, appears optimum.

In order to handle a process stream with relatively high quantities of both hydrogen and ethylene it was felt that one approach for accomplishing the conversion and removal of the oxygen content without causing ethylene saturation would be to increase the selectivity of the catalyst for the hydrogen-oxygen combination while at the same time inhibiting the hydrogenation function. In one instance, there was an attempt to saturate the charge stream so as to provide in effect a "wet" catalyst to increase the oxygen removal rate. However, this operation was ineffective since the ethylene saturation appeared to proceed at a rapid rate. In another instance, carbon monoxide was added to the charge stream, but here again there was no selective action provided and ethylene hydrogenation again proceeded at a rapid rate. On the other hand, it was found that the presence of sulphur and the use of a normally active hydrogenation-oxidation type catalyst, along with suitable operating conditions would effect the desired substantially complete removal of oxygen while at the same time limiting ethylene saturation to not more than about 3 to 4 percent.

Further, it was found that the sulphur content should be provided in an amount of from 1 to 15 grains per 100 standard cubic feet of the charge stream. This quantity may of course vary with a particular charge stream and with the quantities of hydrogen and ethylene which are present. For example, with a processing stream having of the order of 20% to 25% of both hydrogen and ethylene, there was better than 95% removal of the oxygen while saturating only 3% of the ethylene by using of the order of 5 grains of sulphur per 100 standard cubic feet of charge stream at a reactor temperature level at about 700° F.

The sulphur may be introduced into the process stream in various ways and from various supply sources so that it is not intended to limit the present invention to any one form of sulphur addiiton. For instance, the sulphur may be added in the form of a mercaptan. Other sulphur compounds could include hydrogen sulfide and various other forms of sulfides and disulfides, such as ethylene sulfide, propylene sulfide or the disulfides thereof, etc. Still other sulphur type compounds might be used, but for convenience gaseous sulphur compounds are of advantage in introducing or admixing them with a gaseous process stream, although it is realized that thioaldehydes, thioketones, or thioacids, might well be utilized, as long as means are provided to effect the uniform introduction thereof, and as long as the compound is capable of being decomposed readily in the presence of the oxidation catalyst being used in the reaction zone. From certain of the test operations carried out, it also appears that the sulphur introduction into the system need not always be continuous. In other words, it is possible that there may be some sulfiding of the catalyst bed such that intermittent breaks in the sulphur addition might well be tolerated.

In the present treating process, it appears that the use of a normally active oxidizing type catalyst will provide the necessary oxygen conversion and removal. The more active catalysts will generally make use of platinum or palladium either alone or in combination with other metallic components. Also, catalysts may be of an all-metal type or of an impregnated inorganic oxide base. For example, an all-metal catalyst may comprise a chrome nickel alloy base material which has been plated with palladium or platinum or a combination thereof and then subsequently pretreated at a high temperature above 600° F. with a heated air stream containing a combustible fuel so that oxidation takes place on the catalytic surface. Actually, the alloy base materials may be certain of the stainless steels, such as Chromel and Nichrome which are trade names for alloys of nickel and chrome or nickel, chrome and iron. The metal may be used in the form of wire, screen, ribbon or other desirable physical form and should be cleaned in a suitable conventional manner prior to the electrodeposition of the active metal coating. Such cleaning may involve immersions in a hot alkaline bath containing caustic soda, silicates and phosphates with surface active agents, and the like. The metal coating to provide the catalytically active surface may be carried out by immersion plating or by electroplating. In the case of palladium and platinum, the deposition is preferably by electroplating, although it is not intended to limit the present invention to any one type of metal coating or coating process.

Active oxidation coatings formed of the precious metals may utilize mixtures of platinum and palladium chlorides in the electroplating process which will result in greater tenacity to the metal base material and extreme resistance to high temperatures. Other components, such as copper, cobalt, nickel, chromium, etc., may be included in the electroplating solution and deposited along with the noble metal active coating. Also other noble metals such as osmium, ruthenium, rhodium, iridium may be used alone or in combination with platinum or palladium to provide a desirable active oxidizing catalyst surface.

In the case of the inorganic oxide base catalysts, various catalytic composites which have oxidizing activity may be utilized; however, those catalysts which appear to provide improved oxidation and sustained activity as compared to other composites will be characterized by the fact that they contain at least one catalytically active metallic component, and preferably one from the platinum group of metals, carried on a refractory inorganic oxide base material.

The various catalytically active metallic components which may be composited with the refractory inorganic oxide carrier material, may comprise, for example, vanadium, chromium, molybdenum, tungsten, members of the iron-group, copper, silver, gold and the platinum-group metals of the Periodic Table. A particular metal may be used in and of itself, or in combination with any of the foregoing metals; however, palladium or platinum is preferably desired by reasons of providing a sustained high activity. Thus a preferred catalyst to be employed for oxidizing a gaseous stream or for improving waste product streams, prior to their discharge into the atmosphere, may comprise the following: palladium, platinum, other noble metals such as iridium, ruthenium, and rhodium, various mixtures, including platinum-iron, platinum-cobalt, platinum-nickel, palladium-iron, palladium-cobalt, palladium-nickel, platinum-palladium, palladium - copper - cobalt, platinum - copper - lithium-cobalt, platinum - cobalt - copper, copper - cobalt - nickel-platinum, platinum-palladium-cobalt, magnesium-platinum, palladium-cobalt-magnesium, lithium-palladium-cobalt, copper-cobalt-lithium, etc. It is understood that the catalytic activity, thermal stability, auto-initiating temperature, and other characteristics of the catalyst of the present invention, are not necessarily equivalent.

In accordance with the present invention, the catalyst may utilize alumina or a special refractory inorganic oxide as the carrier material for the catalytically active metallic components hereinbefore set forth. For example, one desirable physical characteristic is that extremely high temperatures do not apparently affect the capability of the material to function as desired. The refractory inorganic oxide carrier material, for utilization in the catalyst of the present invention, may be manufactured by various suitable methods, including separate, successive or co-precipitation methods of manufacture.

The term "alumina" is intended to include porous aluminum oxide in the various states of hydration. In addition to alumina, the improved carrier may incorporate at least one other refractory inorganic oxide in conjunction with the alumina. Specifically, an oxide such as silica, or titania, zirconia, hafnia or a mixture of two or more of such oxides may be incorporated with the alumina. The addition or incorporation of any of these refractory inorganic oxides, with the alumina, is generally dependent upon the desire to add thereto certain physical and/or chemical characteristics. The added oxide, or oxides, may be present within the carrier material in an amount within the range of about 0.5% to about 20.0% by weight thereof. Intermediate quantities are preferred and will be normally within the range of about 1.0% to about 10.0% by weight. The additional oxide, or oxides, may be effectively incorporated with the alumina by adding a water soluble salt of the component into the solution from which the alumina is precipitated. However, the particular method employed for the manufacture of the alumina and other refractory material composited therewith, is not considered an essential feature of the present invention. The catalyst may take the form of any desired shape such as spheres, pills, extrudates, powder, granules, cakes, etc. The preferred form of support is the sphere, and spheres of the improved carrier of this invention may be continuously manufactured by the well known oil drop method, following the procedure described in U.S. Patent No. 2,620,314 issued to James Hoekstra. Regardless of the method of manufacturing the refractory inorganic oxide particles, such particles are generally subjected to specific aging treatments. In one embodiment, the refractory material may be prepared by effecting such aging treatments under sufficient pressure to maintain water in a liquid phase, while aging under a temperature level in excess of about 210° F.

An acidic oxide, such as titania, or zirconia, compounded with the alumina normally imparts some acidic properties to the catalytic support; however, where desider, a halogen or phosphorus may be combined with the composite support to provide a further acidic constituent, and may be added in any suitable manner, either before or after the incorporation of the catalytically active metallic component to the support.

The catalytically active metallic component utilized in the preparation of the catalysts for the oxygen removal will generally be present in the composite within the range of about 0.01% to about 20.0% by weight thereof. Where the metal component is selected from the platinum-group, the same will be present in an amount within the range of about 0.05% to about 2.0% by weight thereof. As hereinabove stated, the metallic components may be incorporated in any suitable manner. Where palladium or platinum is employed, by reason of its being a preferred activating component, it may be added to the carrier material by commingling the latter with an aqueous solution of chloropalladic acid. Other water-soluble compounds of palladium, or of the other noble metal components, may be utilized within the impregnating solution, and include ammonium chloropalladinate, palladious chloride, palladic chloride, dinitrito-diammino-palladium, etc. Where the catalyst is to contain other metallic components, such as those hereinbefore set forth, the catalyst may be prepared by commingling water-soluble compounds of these components, particularly the nitrates, sulfates, chlorates, chlorides, carbonates, and soaking the particles of the inorganic refractory oxide therein followed by heating to form the corresponding oxides of the metallic components. Although the precise means by which the metallic component is combined with the refractory material is not known, it is believed that it exists in some physical association or chemical complex therewith. Thus, the active metal component may be present as such or as a chemical compound or in physical association with the refractory inorganic oxide, or with the other catalytically active metallic components, or in some combination with both.

Other metallic components, either in conjunction with, or instead of, a precious metal component, will be present in an amount of from about 0.01% to about 30.0% by weight. Lower concentrations are preferred and lie within the range of about 1.0% to about 20.0% by weight, calculated as the oxides thereof.

It is believed that the following examples will serve to help clarify the present improved processing operation for eliminating low quantities of oxygen and at the same time substantiallp precluding ethylene saturation in a hydrogen-ethylene rich stream. In a series of different test operations, a test gas stream was used which maintained approximately 0.3% to 0.4% oxygen, 19.6% to 22.6% hydrogen and approximately 23.6% ethylene. The balance of the test stream varied, being primarily nitrogen in some test runs and propane in others. Also, as will be seen, that some ethyl mercaptan was added in certain operations to provide an increase in the sulphur content in the stream and to give improved conversion results.

The test unit utilized a small 1″ by 5″ long cylindrical reactor section adapted to hold catalyst pills or three 1″ diameter x 1¼″ deep all-metal catalyst mats. An electric resistance heater coil unit was provided around a tubular inlet section to the reactor in order to provide preheat thereto. Thermocouples were placed upstream and downstream of the catalyst zone to give readings on a temperature differential thereacross. A Beckman oxygen analyzer was used to measure for oxygen conversion and disappearance. Also, gas samples were taken in most test runs which were later subjected to gas chromatography for analysis and to determine the extent of ethylene hydrogenation.

EXAMPLE I

In one test operation, there was utilized in the test reactor zone a packet of catalyst mats which were of crimped alloy ribbon with an electroplated coating of platinum and palladium so as to give a customary high oxidizing activity. The test gas stream was, as noted hereinbefore, a low oxygen content, and hydrogen-ethylene rich stream, with nitrogen providing the balance of the blend.

With no preheat and no pressure, there was an immediate sharp rise in temperature showing substantial hydrogenation of ethylene, so that the process stream was cut-off to the unit.

EXAMPLE II

In an operation which was the same as for Example I, except for the charge to the unit being with a stream pressure of 180 p.s.i.g., there was an immediate rise in temperature from about 70° F. at the inlet to 660° F. at the outlet. Here again, it appeared that hydrogenation took place rapidly under the superatmospheric conditions, as well as at atmospheric conditions, and that increased pressure had no significant affect.

EXAMPLE III

In another test operation, the small test reactor was filled with ⅛″ spheres of an inorganic oxide supported oxidation-hydrogenation type catalyst comprising an alumina base with approximately 0.4% palladium, by weight of the support.

Again, operating with a charge stream similar to that for the previous examples, at ambient temperature and at atmospheric pressure, there was a rapid rise in the reactor outlet temperature to the 680° F. range. This indicated substantial hydrogenation and an activity similar to that for the metallic catalyst mats and no oxygen reading was made, nor was any subsequent gas analysis made.

EXAMPLE IV

In another operation, there was used a catalyst the same as that used for Examples I and II, but there was a modified test gas stream with some 52.0% propane making up the balance of the stream instead of the notrogen. The propane was actually utilized to provide a small quantity of sulphur of the order of one grain per 100 standard cubic feet resulting from ethyl mercaptan being added as an odor to the bottled propane L.P.G. Hydrogen was present at about 23.6%, ethylene at 24% and oxygen at about 0.4%.

With no pressure and with a preheat temperature to about 280° F., there was an approximate 53% disappearance of oxygen. In this case there was no temperature rise across the reactor and thus apparently no appreciable hydrogenation.

EXAMPLE V

In another test using the propane diluent in the charge stream, but with the spherical alumina-palladium spherical catalyst particles (as set forth in Example III) there was a preheat to the order of 600° F. at atmospheric pressure. In this case, there was a temperature rise to about 740° F. showing some slight saturation of ethylene and an oxygen convertion of 97.0%.

EXAMPLE VI

In still another test using the all-metal catalyst mats, additional sulphur was added to the charge stream by introducing ethyl mercaptan into the L.P.G. diluent such that approximately 5 grains of sulphur was present per 100 standard cubic feet of gas. The inlet stream analysis thus showed about 23.5% hydrogen, 0.3% oxygen; 27.4% ethylene, 6.4% ethane and 38.8% propane, as principal components. With an atmospheric pressure and a 700° F. preheat, there was a 70% temperature rise across the reactor to the order of 770° F. and resulting substantially complete removal of oxygen from the exit stream while effecting only about 3.8% hydrogenation of the ethylene.

EXAMPLE VII

In a further test operation, similar to the prior Example VI, except for an increased operating pressure of the order of 180 p.s.i.g., there was a temperature increase from 745° F. to 780° F. with a resulting substantially complete removal of oxygen and only about 4% ethylene saturation.

EXAMPLE VIII

In another 180 p.s.i.g. pressure operation, similar to the prior example, there was a charge stream utilized which provided 60.9% nitrogen, in lieu of the L.P.G. diluent, with sulphur in an amount providing approximately 5 grains per 100 standard cubic feet. In the test, with a preheat temperature of 730° F. there was a temperature rise of only 10° F. and a resulting 99.4% conversion of the oxygen present in the charge stream and ethylene saturation was not noticeable.

I claim as my invention:

1. A method for converting and removing a low oxygen content from a process stream containing at least 20% of both hydrogen and ethylene to substantially preclude ethylene conversion, which comprises, passing such stream into contact with an active oxidation catalyst comprising a noble metal at a temperature above about 650° F. and with sulphur added in an amount from about 1 to about 15 grains per 100 standard cubic feet thereof.

2. The method of claim 1 further characterized in that said active catalyst comprises a metal alloy base material having a catalytically active metal component deposited thereon selected from the group consisting of palladium, platinum and mixtures thereof.

3. The method of claim 1 further characterized in that said active catalyst comprises a refractory inorganic oxide support having an active catalytic metal component composited therewith selected from the group consisting of platinum, palladium and mixtures thereof.

4. The method of claim 3 still further characterized in that said catalyst comprises an alumina-palladium composite.

5. The method of claim 1 further characterized in that sulphur is added to the process stream as a mercaptan.

6. The method of claim 1 further characterized in that sulphur is added to the processing stream as a gaseous sulfide.

References Cited

UNITED STATES PATENTS 3,084,023  4/1963  Anderson et al. _____ 23—3

OSCAR R. VERTIZ, Primary Examiner

E. C. THOMAS, Assistant Examiner

U.S. Cl. X.R.

260—677